Aug. 1, 1961 C. E. LASHO, JR., ET AL 2,994,416

MOUNTING STRUCTURE

Filed May 20, 1959

INVENTORS
ROGER J. PIERCE
CLARENCE E. LASHO JR.
BY
Moody and Phillips
ATTORNEYS

2,994,416
MOUNTING STRUCTURE

Clarence E. Lasho, Jr., Marion, and Roger J. Pierce, Cedar Rapids, Iowa, assignors to Collins Radio Company, Cedar Rapids, Iowa, a corporation of Iowa Filed May 20, 1959, Ser. No. 814,641
8 Claims. (Cl. 189—36)

This invention relates generally to methods of securing a first plate to a second plate, and more particularly to a method of securing a first plate to a second plate by means of pins rigidly secured to said first plate and fastened in recesses provided therefor, in said second plate.

There are many occasions when it is desired to fasten one plate to another. For example, in the electronic art it is desirable sometimes to fasten a chassis to a casing or supporting means, such fastening involving the securing of one side of the chassis to a side of the casing or supporting means. One means by which the aforementioned fastening can be accomplished is to provide pins extending outwardly and rigidly from the side of the chassis and to provide holes in the casing to receive said pins, and further to provide means for securing the pins within the holes. The last mentioned means can be in the form of nuts which screw onto a threaded portion of the pin. There exists, however, with such means, a primary difficulty in that it is quite difficult to obtain exact positioning between the pins and the holes so that precise coincidence therebetween is obtained. To alleviate this alignment problem the holes in the casing can be made larger than the pins, thus providing for a certain amount of tolerance. Such an expedient is suitable for many applications, but becomes unsuitable where vibration is great and the chassis could thereby shift its position with respect to the casing, due to the enlarged holes. Such vibration likely would occur in the case of airborne equipment, for example.

A further problem incidental to the use of airborne electronic equipment is that in some applications it is desired that the equipment be hermetically sealed. In such an instance, it would be necessary, of course, that the fastening of the chassis to the casing should comprise a hermetical seal.

It is an object of the present invention to provide a means for securing two plates together in such a manner that vibration will produce a minimum amount of shift in position of said two plates.

Another aim of the invention is to provide a vibration resistance mounting means employing guide pins and which forms a hermetical seal.

A further purpose of the invention is to provide means for mounting a first plate to a second plate employing guide pins secured on one plate and apertures formed in the other plate and positioned to receive said guide pins, and wherein said apertures are movable to accommodate discrepancies in the alignment between said guide pins and the apertures.

A fourth object of the invention is the improvement of mounting means generally.

In accordance with the invention, there is provided a plurality of pins mounted rigidly on said first plate in a predetermined pattern and a plurality of holes formed through said second plate and positioned to be individually coincident with one each of said pins. In each of said holes there is provided rotatable bushing means extending therethrough. On one end of the bushing there is provided an aperture or recess for receiving the associated pin, said recess having an axis which is eccentric with the axis of rotation of the bushing. On the other side of the bushing is provided means for rotating said bushing to align the pin and the aperture properly, and means for locking said bushing in a desired angular position.

In accordance with a feature of the invention, after the pin has been inserted into the eccentric aperture, the bushing can be rotated further until the inner bushing walls forming the eccentric aperture exert a transverse force upon the pin to lock it in a fixed position and prevent movement thereof. Such a transverse force can be produced, however, only by the cooperative action of two or more pins and associated bushings since one pin and bushing must form an anchor against which the other pin and bushing can act.

In accordance with another feature of the invention a seal can be positioned between said bushing and the plate holding the bushing to perform a hermetic seal between the plate and the bushing.

The above mentioned and other objects and features of the invention will be more fully understood from the following detailed description when read in conjunction with drawings in which.

It is to be noted that corresponding elements in the various figures will be identified by the same reference character, although primed in succeeding figures.

Figure 1:
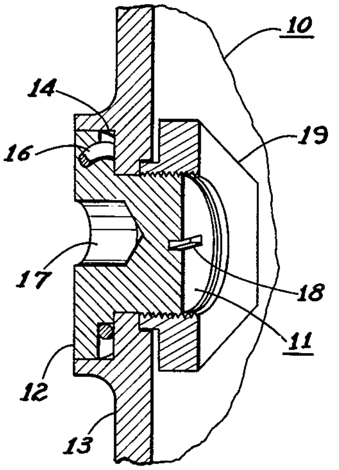
FIG. 1 is a perspective view of the bushing portion of the invention and the plate holding the bushing, with portions thereof broken away.

Referring now to FIG. 1 the plate 10 has an aperture therein into which is fitted the rotatable bushing 11. The bushing 11 comprises an annular flange 12 which sits on the counterbore 13 of the plate 10. An annular groove 14 is formed in the annular flange into which an O-shaped gasket 16 is positioned. Recess 17 is formed on one side of the bushing to receive a pin such as one of the pins 21, 24, or 25 of FIG. 3. It is to be noted that the axis of the recess 17 is eccentric with the axis of the rotation of rotatable bushing 11. Consequently, as the bushing 11 is rotated the position of the recess 17 will move with respect to the plate 10. Thus, if the pin, which is to fit into the recess 17, is slightly misaligned therewith, the rotation of the bushing 17 will function to move the position of the recess 17 until the pin and the recess do become aligned (assuming that the amount of misalignment does not exceed the permissible tolerances of the design).

Once the pin is inserted into the recess 17 a further turning of the bushing 11 will function to produce a transverse force upon the pin, assuming that at least one of the other pins is anchored in a recess.

After the bushing 11 has been rotated to produce a binding force upon the pin in the recess 17 the lock nut 19 can be tightened upon the plate 10 to lock the bushing in the pin-locking angular position. It is to be noted that the bushing 11 is rotatable by means of a screw drive inserted in the slot 18 of bushing 11. The tightening of the lock nut 19 further produces the effect of drawing the annular flange 12 upon the seal 16 to provide a hermetic seal between the plate 10 and the bushing 11.

Figure 2:
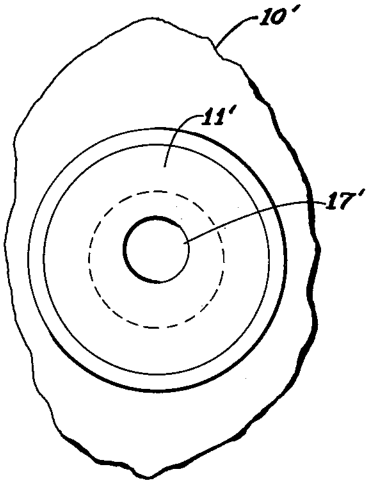
FIG. 2 is a plan view of one side of the bushing.

In FIG. 2 there is shown a plan view of the side of bushing 11′ containing the recess 17′. It can be seen that the recess 17′ is eccentric with the axis of rotation of the bushing 11′.

Figure 3:
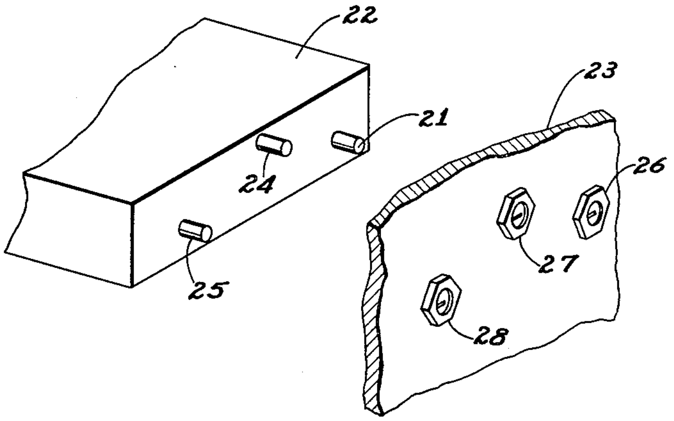
FIG. 3 shows the general relationship between the pins and the bushings.

In FIG. 3 there is shown a structure 22 which may be a radio equipment chassis. It is desired to secure this chassis to a supporting plate 23 which may be a part of a hermetically sealed encasement. The pins 21, 24, and 25 are associated respectively with the bushing mountings 26, 27, and 28. Each of the bushing mountings 26, 27, and 28 is constructed in accordance with the detailed structure shown in FIG. 1. In the process of mounting the chassis 22 the lock nuts on the bushings 26, 27, and 28 are loosened initially to permit rotation of the bushings until the pins 21, 24, and 25 will slip into their respective recesses in the bushings. The bushings can then be rotated and locked individually so that each pin is held securely with no opportunity to shift transversely with respect to the plate 23.

It is to be noted that the form of the invention shown and described herein is but a preferred embodiment thereof and that various changes may be made in the design and the construction thereof without departing from the spirit or scope of said invention.

We claim:

1. Means for securing a first plate to a second plate comprising a plurality of pins mounted rigidly in said first plate, said second plate constructed to form a plurality of holes therethrough in positions corresponding to the positions of individual ones of said pins, rotatable bushing means positioned in each hole and constructed to have a recess therein for receiving the corresponding pin, said bushing means further constructed to have the axis of said recess eccentric and substantially parallel with the axis of rotation of said rotatable bushing means and becoming substantially coincident with the end projection of the corresponding pin in one angular position of said rotatable bushing means, means for supplying an angular force to said rotatable bushing means, and means for locking said rotatable bushing means in a given angular position.

2. Means for securing a first plate to a second plate in accordance with claim 1 in which said means for supplying an angular force to said rotatable bushing means comprises a slot on one side of said rotatable bushing means for receiving a turning implement.

3. Means for securing a first plate to a second plate in accordance with claim 1 comprising means for preventing the end of said rotatable bushing means having said recess therein from passing through said second plate, thread means formed on the other end of said rotatable bushing means, and nut means constructed to engage said thread means to draw said rotatable bushing means into close contact with said second plate.

4. Means for securing a first plate to a second plate in accordance with claim 3 comprising a gasket means positioned between said rotatable bushing means and said second plate and constructed to form a hermetic seal therebetween when said nut means is tightened.

5. Means for securing a first plate to a second plate comprising a plurality of pins mounted rigidly in said first plate, said second plate constructed to form a plurality of holes therethrough in positions corresponding to the positions of individual ones of said pins, rotatable bushing means positioned in each hole and constructed to have a recess at a first end thereof for receiving the corresponding pin, said bushing means further constructed to have the axis of said recess eccentric and substantially parallel with the axis of rotation of said rotatable bushing means and becoming substantially coincident with the end projection of the corresponding pin in one angular position of said rotatable bushing, said rotatable bushing means further constructed to have an annular flange on the end of said rotatable bushing having said recess, said annular flange having a larger diameter than the diameter of said hole, means for supplying an angular force to said rotatable bushing, and means for locking said rotatable bushing means in a given angular position.

6. Means for securing a first plate to a second plate in accordance with claim 5 in which said means for supplying an angular force to said rotatable bushing means comprises a slot on one side of said rotatable bushing means constructed to receive a turning implement.

7. Means for securing a first plate to a second plate in accordance with claim 5 in which said means for locking said bushing comprises thread means formed on the end of said rotatable bushing means opposite said first end, and nut means constructed to engage said thread means to draw said rotatable bushing means into close contact with said second plate.

8. Means for securing a first plate to a second plate in accordance with claim 7 comprising a gasket means positioned between the annular flange of said rotatable bushing means and said second plate and constructed to form a hermetic seal therebetween when said nut means is tightened.

References Cited in the file of this patent

UNITED STATES PATENTS

| | | |
|---|---|---|
| 2,082,173 | Miller | June 1, 1937 |
| 2,668,949 | Leopold et al. | Feb. 9, 1954 |

FOREIGN PATENTS

| | | |
|---|---|---|
| 741,729 | Germany | Nov. 16, 1943 |